United States Patent
Nagai et al.

(10) Patent No.: US 12,202,541 B2
(45) Date of Patent: Jan. 21, 2025

(54) HOOD INNER PANEL AND VEHICLE HOOD

(71) Applicant: SUBARU CORPORATION, Tokyo (JP)

(72) Inventors: Junya Nagai, Tokyo (JP); Yoshio Wada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 293 days.

(21) Appl. No.: 17/957,488

(22) Filed: Sep. 30, 2022

(65) Prior Publication Data

US 2023/0111971 A1    Apr. 13, 2023

(51) Int. Cl.
*B62D 25/10* (2006.01)
*B62D 21/15* (2006.01)

(52) U.S. Cl.
CPC ............ *B62D 21/15* (2013.01); *B62D 25/10* (2013.01); *B62D 25/105* (2013.01)

(58) Field of Classification Search
CPC ....... B62D 25/10; B62D 25/105; B62D 25/12
See application file for complete search history.

(56) References Cited

U.S. PATENT DOCUMENTS

| | | | | |
|---|---|---|---|---|
| 6,048,022 A * | 4/2000 | Ishibashi | .............. | B62D 25/105 296/193.11 |
| 2005/0161979 A1* | 7/2005 | Chernoff | .............. | B62D 25/105 296/191 |
| 2011/0169303 A1* | 7/2011 | Ikeda | ..................... | B60R 21/34 296/193.11 |
| 2013/0241241 A1* | 9/2013 | Sekikawa | ............... | B60R 21/34 296/193.11 |
| 2016/0038019 A1* | 2/2016 | Gierhart | ............... | A61B 5/7275 351/246 |
| 2016/0280277 A1* | 9/2016 | Shastry | ................ | B62D 25/105 |
| 2017/0282978 A1* | 10/2017 | Yoshida | ............... | B62D 25/105 |
| 2018/0072262 A1* | 3/2018 | Nakasako | ............ | B62D 25/105 |
| 2020/0307713 A1* | 10/2020 | Nishino | ............... | B62D 25/105 |
| 2020/0361539 A1* | 11/2020 | Muhammad | .............. | B32B 7/12 |
| 2021/0061367 A1* | 3/2021 | Hahnlen | ................ | B21D 22/02 |
| 2021/0300479 A1* | 9/2021 | Onaka | .................. | B62D 25/105 |
| 2022/0126926 A1* | 4/2022 | Nishimura | ........... | B62D 29/005 |
| 2023/0014209 A1* | 1/2023 | Lopez | .................... | B62D 25/12 |

(Continued)

FOREIGN PATENT DOCUMENTS

JP    H10-129529 A    5/1998

*Primary Examiner* — Gregory A Blankenship
(74) *Attorney, Agent, or Firm* — MCGINN I.P. LAW GROUP, PLLC

(57) ABSTRACT

A hood inner panel for a vehicle includes a first member configured to bend upon a collision of the vehicle, and a second member configured to bent and disposed behind the first member. The first and second members respectively include a first protrusion and a second protrusion that protrude downward. The first protrusion includes a central section that extends in a vehicle width direction of the vehicle from a center in the vehicle width direction and an outer section that extends outward in the vehicle width direction from an outer edge of the central section in the vehicle width direction and that has a backward inclination angle that increases as a position thereof is nearer to outside in the vehicle width direction. The second protrusion extends in the vehicle width direction and at least partly overlaps the outer section of the first protrusion in the vehicle width direction.

12 Claims, 5 Drawing Sheets

(56) References Cited

U.S. PATENT DOCUMENTS

| | | | | |
|---|---|---|---|---|
| 2023/0111971 A1* | 4/2023 | Nagai | .................... | B62D 21/15 |
| | | | | 296/187.09 |
| 2023/0115536 A1* | 4/2023 | Nagai | .................... | B62D 25/12 |
| | | | | 49/501 |
| 2023/0117169 A1* | 4/2023 | Ishizuka | .............. | B62D 25/105 |
| | | | | 180/69.2 |
| 2023/0150582 A1* | 5/2023 | Miadowitz | ............. | B62D 25/12 |
| | | | | 296/181.2 |
| 2024/0199141 A1* | 6/2024 | Renner | .................... | B32B 3/30 |

* cited by examiner

HOOD INNER PANEL AND VEHICLE HOOD

CROSS-REFERENCE TO RELATED APPLICATIONS

The present application claims priority from Japanese Patent Application No. 2021-166658 filed on Oct. 11, 2021, the entire contents of which are hereby incorporated by reference.

BACKGROUND

The disclosure relates to a hood inner panel that includes a member to be bent configured to bend when a vehicle has a collision, and a vehicle hood that includes the hood inner panel.

A known panel that is used for a vehicle hood includes a member to be bent configured to bend when a vehicle has a collision (see, for example, Japanese Unexamined Patent Application Publication (JP-A) No. H10-129529). JP-A No. 10-129529 discloses a synthetic resin panel for an automobile, and the panel is formed by blow-molding, includes an outer skin and a stiffener integral with the outer skin, and is used as a hood or a trunk lid. As for the synthetic resin panel, the stiffener includes a tub-like portion that extends in a widthwise direction of a vehicle body toward the outer skin, and a ridge of the tub-like portion is spaced apart from the outer skin, so that the panel is configured to be folded from a start point provided by the tub-like portion by a shock force from the front or rear of the vehicle body.

SUMMARY

An aspect of the disclosure provides a hood inner panel for a vehicle. The hood inner panel includes a first member and a second member. The first member is configured to bend upon a collision of the vehicle. The second member is configured to bent and disposed behind the first member. The first member includes a first protrusion that protrudes downward, and the second member includes a second protrusion that protrudes downward. The first protrusion includes a central section that extends in a vehicle width direction of the vehicle from a center in the vehicle width direction and an outer section that extends outward in the vehicle width direction from an outer edge of the central section in the vehicle width direction. The outer section has a backward inclination angle that increases as a position of the outer section is nearer to outside in the vehicle width direction. The second protrusion extends in the vehicle width direction and at least partly overlaps the outer section of the first protrusion in the vehicle width direction.

An aspect of the disclosure provides a vehicle hood comprising for a vehicle. The vehicle hood includes the hood inner panel and a reinforced panel disposed on a lower surface of the hood inner panel. The reinforced panel is disposed so as to be across the first member in a plan view. The reinforced panel has a depression that is depressed inward in the vehicle width direction on an outer edge in the vehicle width direction where the reinforced panel is across the first member.

DETAILED DESCRIPTION

As for the panel disclosed in JP-A No. 10-129529, a bend starts from the tub-like portion in a single step when the vehicle has a collision, and the degree at which the panel enters a vehicle cabin increases depending on the form of the bend of the panel.

It is desirable to provide a hood inner panel that enables the degree at which a panel enters a vehicle cabin to be decreased when a vehicle has a collision, and a vehicle hood that includes the hood inner panel.

Figure 1:
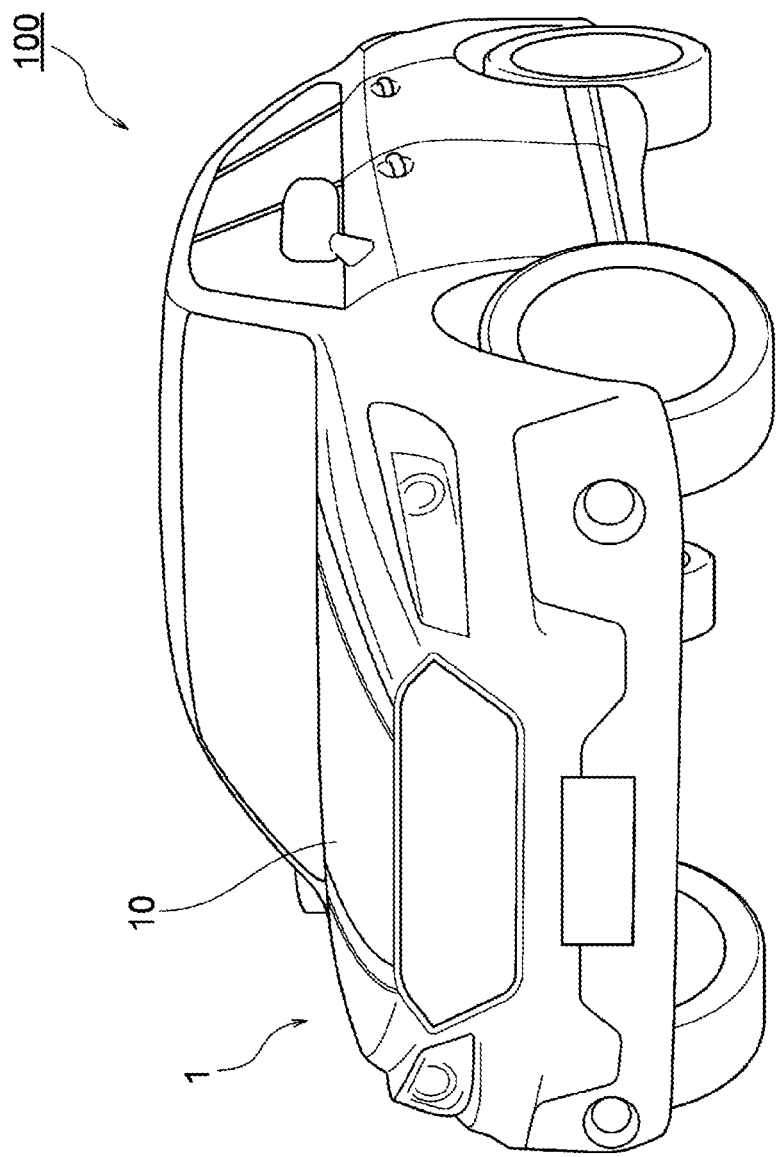
FIG. 1 is a perspective view of a vehicle according to an embodiment of the disclosure.
Figure 2:
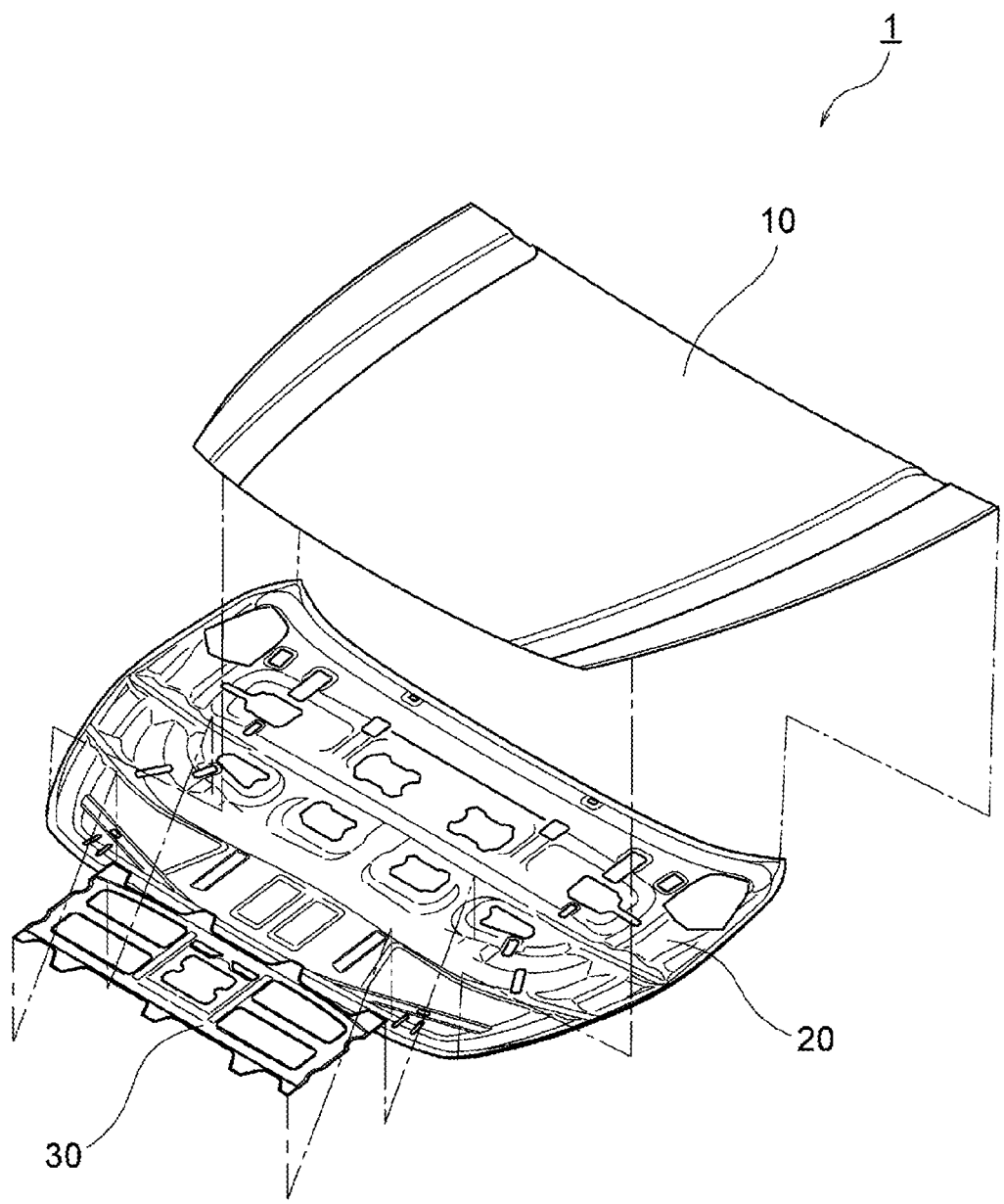
FIG. 2 is an exploded perspective view of a vehicle hood.
Figure 3:
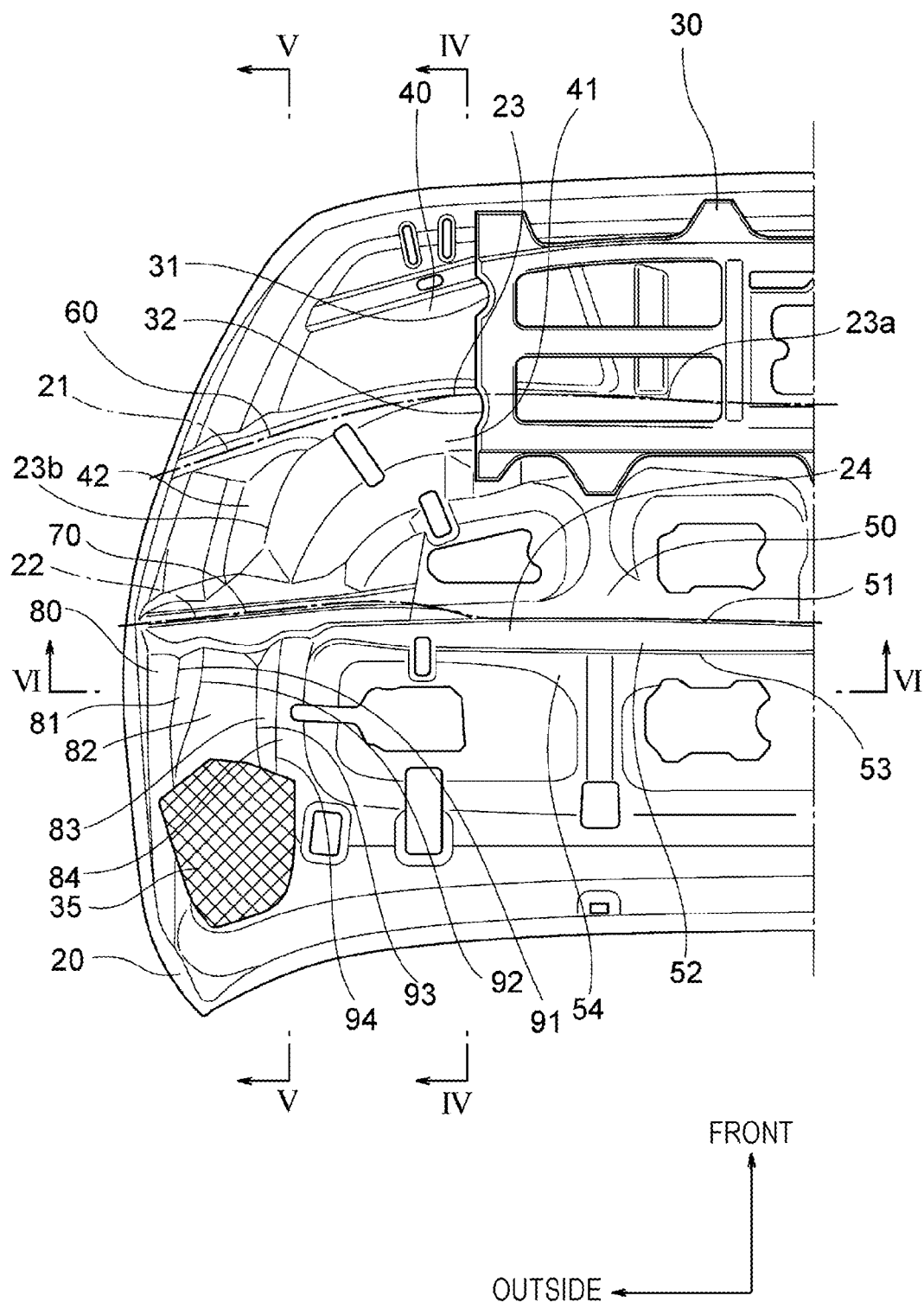
FIG. 3 is a partial bottom view of an inner panel.
Figure 4:
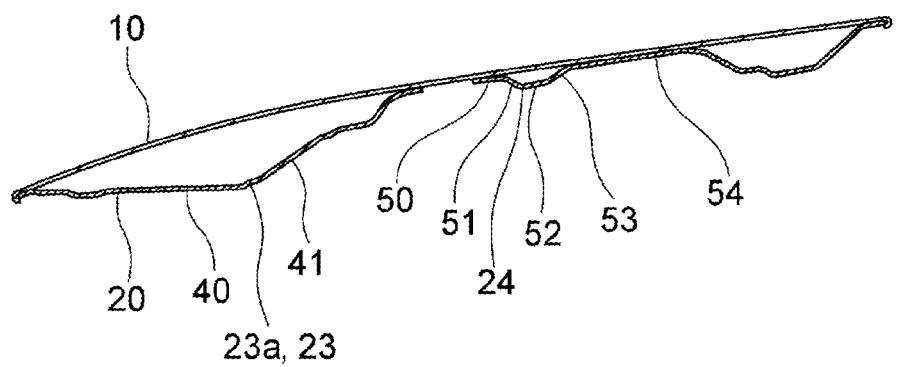
FIG. 4 is a sectional view of FIG. 3 taken along line IV-IV.
Figure 5:
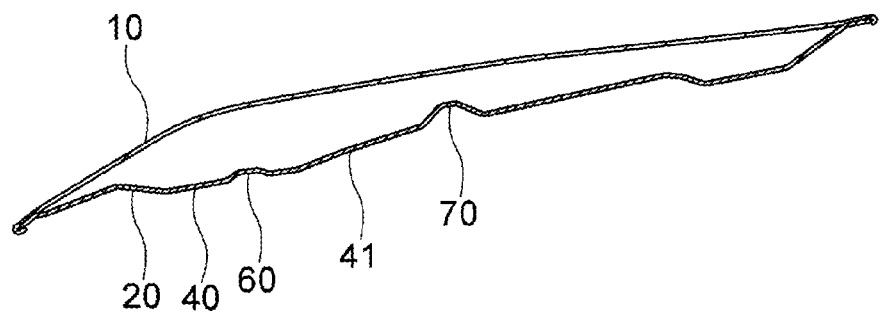
FIG. 5 is a sectional view of FIG. 3 taken along line V-V.
Figure 6:
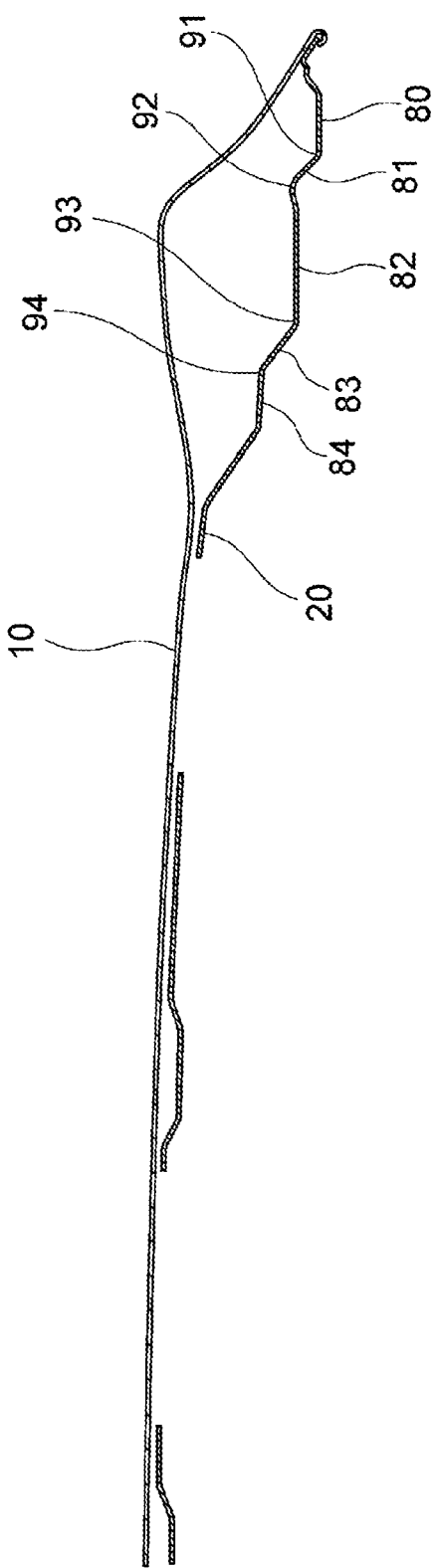
FIG. 6 is a sectional view of FIG. 3 taken along line VI-VI.

FIG. 1 to FIG. 6 illustrate an embodiment of the disclosure. FIG. 1 is a perspective view of a vehicle according to an embodiment of the disclosure. FIG. 2 is an exploded perspective view of a vehicle hood. FIG. 3 is a partial bottom view of an inner panel. FIG. 4 is a sectional view of FIG. 3 taken along line IV-IV. FIG. 5 is a sectional view of FIG. 3 taken along line V-V. FIG. 6 is a sectional view of FIG. 3 taken along line VI-VI.

As illustrated in FIG. 1, a vehicle 100 includes a vehicle hood 1 that covers an engine room from above. The vehicle hood 1 includes an outer panel 10 that has a design surface. The outer panel 10 has depressions that extend in a front-rear direction. The depressions are formed along outer edges of the outer panel 10 in a vehicle width direction and extend in the front-rear direction so as to be paired with each other in a left-right direction.

As for the vehicle hood 1, as illustrated in FIG. 2, the outer panel 10 as an upper panel and an inner panel 20 as a lower panel are disposed so as to overlap in a plan view. A reinforced panel 30 is disposed near a front edge of a lower surface of the inner panel 20 so as to face a locking mechanism (not illustrated) that is disposed near a front edge of the vehicle hood 1. The vehicle hood 1 has a plate shape that is formed by using the outer panel 10, the inner panel 20, and the reinforced panel 30 as a whole. The materials of the outer panel 10, the inner panel 20, and the reinforced panel 30 are freely selected and can be, for example, metal or plastic. Aluminum is used according to the present embodiment.

As illustrated in FIG. 3, a bracket 35 for mounting a hinge is disposed near a rear edge of the inner panel 20 and near an outer edge in the vehicle width direction. In FIG. 3, this is illustrated by using intersecting oblique lines in order to distinguish this from, for example, a hole. The inner panel 20 includes a first member 21 to be bent configured to bend when the vehicle has a collision and a second member 22 to be bent behind the first member 21 to be bent. According to the present embodiment, the second member 22 to be bent is located substantially at the center of the inner panel 20 in the front-rear direction, and the first member 21 to be bent is located at the middle between the front edge of the inner panel 20 and the second member 22 to be bent.

As illustrated in FIG. 4, the first member 21 to be bent includes a first protrusion 23 that protrudes downward. As illustrated in FIG. 3, the first protrusion 23 includes a central section 23a that extends in the vehicle width direction from the center in the vehicle width direction and an outer section 23b that extends outward in the vehicle width direction from an outer edge of the central section 23a in the vehicle width direction and that has a backward inclination angle that increases as the position thereof is nearer to the outside in the vehicle width direction. The central section 23*a* of the first protrusion 23 is defined by a horizontal surface 40 that is substantially horizontal as a front surface and an inclined surface 41 that rises backward as a rear surface. The outer section 23*b* of the first protrusion 23 is defined by the inclined surface 41 that rises inward in the vehicle width direction as an inner surface in the vehicle width direction and a horizontal surface 42 that is substantially horizontal as an outer surface in the vehicle width direction. The inclined surface 41 is a bowl-like surface.

According to the present embodiment, the reinforced panel 30 is disposed so as to be across the first member 21 to be bent in a plan view. The reinforced panel 30 has depressions 31 and 32, from which deformation starts when the vehicle has a collision, on an outer edge in the vehicle width direction. According to the present embodiment, the depressions 31 and 32 are formed at two positions away from each other in the front-rear direction, and the depression 32 is formed as a rear depression at a position at which the reinforced panel 30 is across the first member 21 to be bent.

As illustrated in FIG. 4, the second member 22 to be bent has a second protrusion 24 that protrudes downward. As illustrated in FIG. 3, the second protrusion 24 extends in the vehicle width direction and at least partly overlaps the outer section 23*b* of the first protrusion in the vehicle width direction. The second protrusion 24 is defined by a first horizontal surface 50, a first inclined surface 51, a second horizontal surface 52, a second inclined surface 53, and a third horizontal surface 54. As illustrated in FIG. 4, the first horizontal surface 50, the first inclined surface 51, the second horizontal surface 52, the second inclined surface 53, and the third horizontal surface 54 are arranged in this order from the front. The first horizontal surface 50, the second horizontal surface 52, and the third horizontal surface 54 are substantially horizontal. The first inclined surface 51 is formed so as to drop backward. The second inclined surface 53 is formed so as to rise backward.

As illustrated in FIG. 5, the first member 21 to be bent includes a first bead 60 that has a depression facing downward, and the second member 22 to be bent includes a second bead 70 that has a depression facing downward. As illustrated in FIG. 3, the first bead 60 extends outward in the vehicle width direction, inclines backward, and extends to a position near an outer edge of the inner panel 20. The second bead 70 extends outward in the vehicle width direction, does not intersect the first bead 60, and extends to a position near the outer edge of the inner panel 20.

As illustrated in FIG. 3, the bracket 35 is disposed behind the second member 22 to be bent so as to be spaced therefrom. According to the present embodiment, a first horizontal surface 80, a first inclined surface 81, a second horizontal surface 82, a second inclined surface 83, and a third horizontal surface 84 are formed in this order from the outside in the vehicle width direction between the bracket 35 and the second bead 70. First to fourth ridge lines 91, 92, 93, and 94 that extend in the front-rear direction are defined by these surfaces. In one example, the first ridge line 91 is defined by the first horizontal surface 80 that is substantially horizontal and the first inclined surface 81 that rises inward in the vehicle width direction. The second ridge line 92 is defined by the first inclined surface 81 and the second horizontal surface 82 that is substantially horizontal. The third ridge line 93 is defined by the second horizontal surface 82 and the second inclined surface 83 that rises inward in the vehicle width direction. The fourth ridge line 94 is defined by the second inclined surface 83 and the third horizontal surface 84 that is substantially horizontal.

As for the vehicle hood 1 that thus configured, as illustrated in FIG. 3, the inner panel 20 bends from the first member 21 to be bent as a front member and the second member 22 to be bent as a rear member in two steps when the vehicle has a collision. This enables the degree at which the inner panel 20 enters the vehicle cabin to be lower than that in the existing case where the inner panel 20 is bent in a single step. As for the inner panel 20 according to the present embodiment, the panel bends from the first bead 60 and the second bead 70 together with the first protrusion 23 and the second protrusion when the vehicle has a head-on collision. In the case where the inner panel 20 bends also from the first bead 60 and the second bead 70, the deformation mode of the inner panel 20 can be stabilized.

The first bead 60 extends outward in the vehicle width direction and inclines backward. For this reason, the first member 21 to be bent can be bent at the first bead 60 and the central section 23*a* of the first protrusion 23 even in the case of a collision such that a colliding object that has a collision surface that extends outward in the vehicle width direction and that inclines backward enters a corner of the front edge of the vehicle toward the rear.

For example, in the case of a collision such that a colliding object obliquely enters an interior in the vehicle width direction toward the rear, the first member 21 to be bent bends from the outer section 23*b* that has the backward inclination angle that increases as the position thereof is nearer to the outside in the vehicle width direction. The collision such that the colliding object thus obliquely enters the interior in the vehicle width direction can be dealt with by using the outer section 23*b*.

According to the present embodiment, the second member 22 to be bent bends at a position away in the front-rear direction from the hinge that is located near the rear edge of the inner panel 20 when the vehicle has a head-on collision. Accordingly, the inner panel 20 is inhibited from bending near the hinge, and the degree at which the inner panel 20 enters the vehicle cabin can be effectively decreased. In one example, deformation between the bracket 35 and the second bead 70 is inhibited from occurring by using the first to fourth ridge lines 91, 92, 93, and 94 that extend in the front-rear direction, and the inner panel 20 can be inhibited from bending near the hinge.

According to the embodiment described above, the first member 21 to be bent includes the first bead 60 that has the depression facing downward, and the second member 22 to be bent includes the second bead 70 that has the depression facing downward. However, the first bead 60 and the second bead 70 can be omitted if necessary, provided that the first protrusion 23 and the second protrusion 24 are included. Positions at which the bracket 35 for mounting the hinge and the reinforced panel 30 for the locking mechanism are installed on the inner panel 20 can be appropriately changed depending on, for example, the kind of the vehicle.

The embodiment of the disclosure is described above. The embodiment described above does not limit claims. It is to be noted that all of combinations of features described according to the embodiment are not necessarily to be provided for the embodiment of the disclosure.

As for a hood inner panel according to an embodiment of the disclosure, the panel bends from a first member to be bent as a front member and a second member to be bent as a rear member in two steps when a vehicle has a head-on collision. This enables the degree at which the panel enters a vehicle cabin to be lower than that in the existing case where a panel is bent in a single step.

The first member to be bent bends from a central section that extends in a vehicle width direction when the vehicle has a head-on collision. For example, in the case of a collision such that a colliding object obliquely enters an interior in the vehicle width direction toward the rear, the first member to be bent bends from an outer section that has the backward inclination angle that increases as the position thereof is nearer to the outside in the vehicle width direction. The collision such that the colliding object thus obliquely enters the interior in the vehicle width direction can be dealt with by using the outer section.

As for the hood inner panel described above, the first member to be bent may include a first bead that has a depression facing downward, and the second member to be bent may include a second bead that has a depression facing downward. The first bead may extend outward in the vehicle width direction, may incline backward, and may extend to a position near an outer edge of the hood inner panel. The second bead may extend outward in the vehicle width direction, may not intersect the first bead, and may extend to a position near the outer edge of the hood inner panel.

As for the hood inner panel, the panel bends from the first bead and the second bead together with a first protrusion and a second protrusion when the vehicle has a head-on collision. In the case where the panel bends also from the first bead and the second bead, the deformation mode of the panel can be stabilized.

The first bead extends outward in the vehicle width direction and inclines backward. For this reason, the outer section of the first member to be bent can be bent even in the case of a collision such that a colliding object that has a collision surface that extends outward in the vehicle width direction and that inclines backward enters a corner of the front edge of the vehicle toward the rear.

The hood inner panel described above may include a bracket for mounting a hinge near a rear edge of the hood inner panel and near an outer edge in the vehicle width direction. The bracket may be disposed behind the second member to be bent so as to be spaced therefrom.

As for the hood inner panel, the second member to be bent bends at a position away in the front-rear direction from the hinge that is located near the rear edge of the panel when the vehicle has a head-on collision. Accordingly, the panel is inhibited from bending near the hinge, and the degree at which the panel enters the vehicle cabin can be effectively decreased.

As for the hood inner panel described above, a ridge line may extend in a front-rear direction between the bracket and the second bead.

As for the hood inner panel, deformation between the bracket and the second bead is inhibited from occurring by using the ridge line that extends in the front-rear direction, and the panel can be inhibited from bending near the hinge.

An embodiment of the disclosure provides a vehicle hood including the hood inner panel described above, and a reinforced panel that is disposed on a lower surface of the hood inner panel. The reinforced panel is disposed so as to be across the first member to be bent in a plan view. The reinforced panel has a depression that is depressed inward in the vehicle width direction on an outer edge in the vehicle width direction where the reinforced panel is across the first member to be bent.

As for the vehicle hood, the rigidity and strength of the inner panel can be increased by using the reinforced panel. Since the reinforced panel has the depression that is depressed inward in the vehicle width direction on the outer edge in the vehicle width direction where the reinforced panel is across the first member to be bent, the reinforced panel deforms from the depression when a vehicle has a head-on collision, and the reinforced panel can be bent together with the first member to be bent of the inner panel.

According to an embodiment of the disclosure, the degree at which a panel enters a vehicle cabin can be decreased when a vehicle has a collision.

The invention claimed is:

1. A hood inner panel for a vehicle, the hood inner panel comprising:
a first member configured to bend upon a collision of the vehicle; and
a second member configured to bend and disposed behind the first member,
wherein the first member comprises a first protrusion that protrudes downward, and the second member comprises a second protrusion that protrudes downward,
wherein the first protrusion comprises a central section that extends in a vehicle width direction of the vehicle from a center in the vehicle width direction and an outer section that extends outward in the vehicle width direction from an outer edge of the central section in the vehicle width direction, the outer section having a backward inclination angle that increases as a position of the outer section is nearer to outside in the vehicle width direction, and
wherein the second protrusion extends in the vehicle width direction and at least partly overlaps the outer section of the first protrusion in the vehicle width direction.

2. The hood inner panel according to claim 1,
wherein the first member comprises a first bead that has a depression facing downward, and the second member comprises a second bead that has a depression facing downward,
wherein the first bead extends outward in the vehicle width direction, inclines backward, and extends to a position near an outer edge of the hood inner panel, and
wherein the second bead extends outward in the vehicle width direction, does not intersect the first bead, and extends to a position near the outer edge of the hood inner panel.

3. The hood inner panel according to claim 1, further comprising:
a bracket for mounting a hinge, the bracket being near a rear edge of the hood inner panel and near an outer edge in the vehicle width direction, and
wherein the bracket is disposed behind the second member and spaced from the second member.

4. The hood inner panel according to claim 2, further comprising:
a bracket for mounting a hinge, the bracket being near a rear edge of the hood inner panel and near an outer edge in the vehicle width direction, and
wherein the bracket is disposed behind the second member and spaced from the second member.

5. The hood inner panel according to claim 3,
wherein a ridge line extends in a front-rear direction of the vehicle between the bracket and the second bead.

6. The hood inner panel according to claim 4,
wherein a ridge line extends in a front-rear direction of the vehicle between the bracket and the second bead.

7. A vehicle hood comprising for a vehicle:
the hood inner panel according to claim 1; and a reinforced panel disposed on a lower surface of the hood inner panel, wherein the reinforced panel is disposed so as to be across the first member in a plan view, and wherein the reinforced panel has a depression that is depressed inward in the vehicle width direction on an outer edge in the vehicle width direction where the reinforced panel is across the first member.

8. A vehicle hood comprising for a vehicle:

the hood inner panel according to claim 2; and a reinforced panel disposed on a lower surface of the hood inner panel, wherein the reinforced panel is disposed so as to be across the first member in a plan view, and wherein the reinforced panel has a depression that is depressed inward in the vehicle width direction on an outer edge in the vehicle width direction where the reinforced panel is across the first member.

9. A vehicle hood comprising for a vehicle:

the hood inner panel according to claim 3; and a reinforced panel disposed on a lower surface of the hood inner panel, wherein the reinforced panel is disposed so as to be across the first member in a plan view, and wherein the reinforced panel has a depression that is depressed inward in the vehicle width direction on an outer edge in the vehicle width direction where the reinforced panel is across the first member.

10. A vehicle hood comprising for a vehicle:

the hood inner panel according to claim 4; and a reinforced panel disposed on a lower surface of the hood inner panel, wherein the reinforced panel is disposed so as to be across the first member in a plan view, and wherein the reinforced panel has a depression that is depressed inward in the vehicle width direction on an outer edge in the vehicle width direction where the reinforced panel is across the first member.

11. A vehicle hood comprising for a vehicle:

the hood inner panel according to claim 5; and a reinforced panel disposed on a lower surface of the hood inner panel, wherein the reinforced panel is disposed so as to be across the first member in a plan view, and wherein the reinforced panel has a depression that is depressed inward in the vehicle width direction on an outer edge in the vehicle width direction where the reinforced panel is across the first member.

12. A vehicle hood comprising for a vehicle:

the hood inner panel according to claim 6; and a reinforced panel disposed on a lower surface of the hood inner panel, wherein the reinforced panel is disposed so as to be across the first member in a plan view, and wherein the reinforced panel has a depression that is depressed inward in the vehicle width direction on an outer edge in the vehicle width direction where the reinforced panel is across the first member.

* * * * *